United States Patent [19]
Weinert

[11] 3,836,247
[45] Sept. 17, 1974

[54] PHOTOGRAPHIC COLOR PRINTING APPARATUS WITH IMPROVED LIGHT TERMINATING MECHANISM

[75] Inventor: Volker Weinert, Munich, Germany

[73] Assignee: Agfa-Gevaert Aktiengesellschaft, Leverkusen, Germany

[22] Filed: Sept. 14, 1973

[21] Appl. No.: 397,244

[30] Foreign Application Priority Data
Sept. 16, 1972 Germany.......................... 2245574

[52] U.S. Cl......................... 355/36, 355/38, 355/88
[51] Int. Cl......................................... G03b 27/76
[58] Field of Search............... 355/35, 38, 4, 88, 36

[56] References Cited
UNITED STATES PATENTS
| | | | |
|---|---|---|---|
| 3,120,782 | 2/1964 | Goddard et al...................... | 355/37 |
| 3,554,642 | 1/1971 | Zahn................................... | 355/38 |
| 3,612,683 | 10/1971 | Riley et al........................... | 355/35 |
| 3,672,768 | 6/1972 | Schaub et al....................... | 355/38 |

*Primary Examiner*—Richard A. Wintercorn
*Attorney, Agent, or Firm*—Michael S. Striker

[57] ABSTRACT

Light from a light source furnishing a first, second and third primary color folds on first, second and third photoreceiver means which furnish, respectively, a first, second and third stop signal when the received light has reached a predetermined total quantity. Logic means are provided for terminating the illumination in the colors corresponding to the first and second so-received stop signals directly by inserting the complementary color filter into the path of the light. The logic means prevent operation of the third complementary filter in response to the third received stop signal and, instead, directly operate the shutter terminating the illumination in all three colors.

7 Claims, 2 Drawing Figures

PATENTED SEP 17 1974  3,836,247

3,836,247

PHOTOGRAPHIC COLOR PRINTING APPARATUS WITH IMPROVED LIGHT TERMINATING MECHANISM

BACKGROUND OF THE INVENTION

The invention relates to photographic apparatus and more specifically to photographic printing apparatus wherein a light source furnishes light in a first, second and third primary color. The apparatus further has a color control channel for each of the three primary colors. This color control channel comprises first and second photoreceiver means, each having a photoreceiver sensitive to a selected one of the three primary colors. An integrating circuit for each of the photoreceivers integrates the signal corresponding to the light received on the photoreceiver and activates a threshold circuit from a first to a second state when the total quantity of light has reached a predetermined quantity. In response to the resulting stop signal, a complementary color filter is moved into the path of the light, thereby terminating the illumination in the corresponding color. Further, the conventional equipment has a shutter which terminates the illumination in all three colors following termination of the individual termination in each color channel.

In the conventional color printing arrangement of the above-described type, the illumination in the color requiring the longest exposure time is ended by the introduction of the complementary filter into the light path. As mentioned above, in addition, a shutter is closed following the termination of the exposure in the third color and the filter is again removed from the path of the light in order that the equipment be ready for carrying out the next print or copying process. It will be noted that in this method all three filters are introduced into the path of the light. This of course is not actually required in particular in fact acting filter control equipment alot of wear results which it is of course very desirable to reduce.

SUMMARY OF THE INVENTION

It is an object of the present invention to reduce the number of activations of each filter, by eliminating the above-described unnecessary activation of the third filter.

The present invention resides in color photographic apparatus having a light source furnishing light in a first, second and third primary color, first, second and third photoreceiver means each sensitive to light received from said light source in a corresponding one of said primary colors for furnishing, respectively, a first, second and third stop signal when the light received in said color has reached a predetermined light quantity. First, second and third individual light terminating means are also present in the equipment, each for terminating the illumination in a corresponding one of said primary colors upon receipt of the corresponding one of said stop signals. Further present in the equipment are common terminating means for terminating the illumination in all three of said colors in response to a terminating signal. In accordance with the present invention, first logic means are provided for preventing the application of the last-furnished one of said stop signals to the corresponding individual light terminating means following receipt of the first two of said stop signals. Further provided are second logic means for furnishing said terminating signal in response to said last-furnished one of said stop signals.

It is thus seen that in accordance with the present invention, the operation of the last filter to enter the path of the light is omitted. The termination of light in the last light channel is accomplished at the same time by means of the shutter which terminates the illumination in all three channels. A resulting decrease of wear of the various color filter and color filter moving apparatus results which is one-third of the total wear for each filter if, on a statistical basis, each filter would be operated last the same number of times as the other filters.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
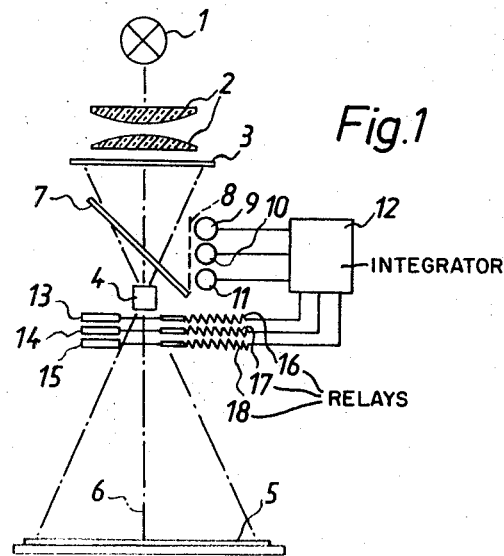
FIG. 1 is a schematic diagram showing a printing arrangement utilizing the present invention.

A preferred embodiment of the present invention will now be described with reference to the drawing.

In FIG. 1 reference numeral 1 denotes a source of illumination which furnishes light in a first, second and third primary color. The light from the source of illumination 1 is collected by a condenser lense 2 and focussed onto an original 3. An image of the original 3 is created via an objective 4 on a light sensitive layer 5.

Prior to the objective in the path of the light from source of illumination 1 is a partially transmissive mirror 7 which is positioned at an angle of 45° to the optical axis 6 of the arrangement. Color filters 8 are arranged in the path of the light from mirror 7 to photoreceivers 9, 10 and 11, which are photoelectric transducers furnishing an electrical signal in response to light falling thereon. The use of the color filters makes each of the photoreceivers sensitive to a particular primary color only. The output of the photoreceiver is connected to circuit means 12 which, in the main, contain an integrating circuit for each of the outputs of the corresponding photoreceivers. The integrating circuit of course furnishes a signal which is indicative of the total quantity of light received by the corresponding photoreceiver. When this total quantity of light has reached a predetermined quantity, each of the integrator circuits furnishes a signal which is sufficient to switch an associated threshold stage from a first to a second state. In the absence of the present invention, each of the threshold circuit outputs would be directly connected to a corresponding one of relay windings 16, 17 and 18, each of which, upon energization, causes a complementary filter, 13, 14 and 15, to be inserted in the path of the light from the original 3 to the photosensitive layer 5. The insertion of each complementary filter of course terminates the illumination in the corresponding primary color.

Figure 2:
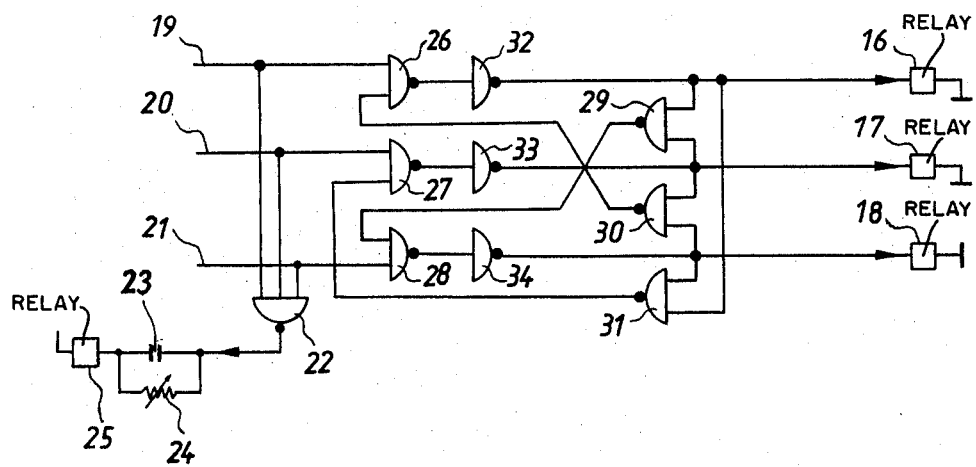
FIG. 2 shows the electrical circuitry which is a preferred embodiment of the present invention.

The logic means which form part of stage 12 in FIG. 1 in accordance with the present invention are shown in FIG. 2. At the inputs 19, 20 and 21 are received the outputs of the above-mentioned threshold stages, that is the signal at inputs 19–21 changes from a "0" to a "1" when the illumination in the corresponding channel is to be terminated. Inputs 19, 20 and 21 are respectively connected to the first, second and third input of a NAND-gate 22. The output of NAND-gate 22 is connected via delay means 24 to a relay coil 25. Activation of relay coil 25 causes the shutter to be moved into the path of the light, thereby terminating the illumination in all three colors. Specifically, delay means 24 comprise a variable resistor connected in parallel with a capacitor. The purpose of delay means 24 is to match the characteristic of relay 25 which is a relatively fast acting relay to the characteristic of filter relays 16, 17 and 18 which have a longer response time.

Inputs 19, 20 and 21 are further respectively connected to the first inputs of a first, second and third AND-gate means. Specifically, the first AND-gate means comprise a NAND-gate 26 followed by an inverter 32, the second AND-gate means comprise a NAND-gate 27 whose output is connected to an inverter 33, while the third AND-gate means comprise a NAND-gate 28 having an output connected to an inverter 24. It will be noted that each of the NAND-gate inverter combinations could be replaced by a simple AND-gate. However, for standardization purposes it is often desirable to use the same type of gate throughout. An inverter of course is a NAND-gate only one input of which is connected.

The output of the first AND-gate means is directly connected to activate relay 16 which, in conjunction with the filter activated thereby, constitutes first individual illumination terminating means. The outputs of the second and third AND-gate means are respectively directly connected to activate the coils of relays 17 and 18, which, again with the filters activated thereby constitute the second and third individual light terminating means.

A further part of the first logic means of the present invention are first, second and third NAND-gates 29, 30 and 31. NAND-gate 29 has a first and second input connected respectively to the outputs of the first and second AND-gate means and an output connected to the second input of the third AND-gate means. NAND-gate 30 has a first and second input respectively connected to the output of the second and third AND-gate means and an output connected to the second input of the first AND-gate means. Finally, NAND-gate 31 has a first and second input respectively connected to the outputs of the third and first AND-gate means and an output connected to the second input of the second AND-gate means.

The above-described arrangement operates as follows:

"0" are present at inputs 19, 20 and 21 at the start of the exposure time. At this time relays 16, 17 and 18 are de-energized. Relay 25, which holds the shutter out of the path of the light when energized, is energized at this point since the output of NAND-gate 22 is a "1" until such time as the inputs on lines 19, 20 and 21 are all "1" signals. If now the illumination in a particular channel has reached the predetermined light quantity, the corresponding stop signal causes the signal on one of the lines 19–21 to change from a "0" to a "1" signal.

Let it first be assumed that the first terminating signal is received at input 19. Thus, the first inputs of NAND-gate 26 is a "1." Since both relays 17 and 18 are deenergized, the output of NAND-gate 30 is also a "1" signal. Thus an output appears at the output of inverter 32, causing relay coil 16 to be energized, thereby terminating the illumination in the first channel. The "1" output of inverter 32 is of course also applied to the first input of NAND-gate 29.

If it is now assumed that the stop signal is next applied to input 21, then the signal on line 21 changes from a "0" to a "1" thereby furnishing a "1" signal at the second input of NAND-gate 28. However, the other input of NAND-gate 28 also has a "1" signal due to its connection to the output of NAND-gate 29. The output of NAND-gate 28 is thus a "0" signal which is changed to a "1" signal by inverter 34. The "1" signal at the output of inverter 34 is used to energize relay 18 and is also applied to one input of NAND-gate 30 and one input of NAND-gate 31. Under these conditions NAND-gate 31 has a "1" input at both of its inputs, causing its output to be a "0" signal which is applied to the second input of NAND-gate 27. Under these circumstances even when a "1" signal appears on line 20, the output of NAND-gate 27 will not change to a "0" signal, thereby preventing the generation of a "1" signal at the output of inverter 33. Relay coil 17 can thus not be energized even when a "1" signal appears at input 20. However, the "1" signal at input 20 causes all inputs of NAND-gate 22 to be energized, thereby causing the output of NAND-gate 22 to be "0" signal. Magnet 25 is thus deenergized after a delay corresponding to the time constant of delay means 24. Thus, instead of activation of the third color filter, the shutter is activated to cut the light on all three channels thereby of course also terminating the light on the third channel. The illumination is therefore terminated. To start a new cycle, the output of the threshold circuits is erased, causing "0" signals to appear again on lines 19, 20 and 21. This again causes the filters to be moved out of the path of the light. The shutter is maintained closed until the start of the next illumination period to prevent stray light from impinging on the photosensitive layer. This can be accomplished by shunting the output of NAND-gate 22 to ground potential by means of a simple double-throw switch which is thrown into the position away from the output of NAND-gate 22 at the start of the subsequent illumination period.

Although in the preferred embodiment illustrating the present invention NAND-gates have been used to accomplish the desired logic functions, the NAND-gates are in themselves of course not essential for the operation of the present invention. Instead of the NAND-gates combinations of relay contacts or even mechanical levers can readily be substituted for these gates. In accordance with the present invention it is only required that some means be provided which accomplish the function of preventing the operation of the third color filter following previous operation of the first two color filters and, instead, causing an activation of the shutter.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In color photographic apparatus having a light source for furnishing light in a first, second and third pimary color, first, second and third photoreceiver means for receiving, respectively, light in said first, second and third primary colors and for furnishing, respectively, a first, second and third stop signal when the so-received light has reached a predetermined total light quantity, first, second and third individual light terminating means, for terminating the illumination in a corresponding one of said primary colors upon receipt of the corresponding one of said stop signals, and common terminating means for terminating the illumination in all three of said primary colors substantially simultaneously in response to a terminating signal, in combination, first logic means for preventing the application of a last furnished one of said stop signals to the corresponding individual light terminating means following receipt of the first two of said stop signals; and second logic means for furnishing said terminating signal in response to said last-furnished one of said stop signals.

2. An arrangement as set forth in claim 1, wherein said individual light terminating means each comprise a complementary filter movable into the path of said light; and means moving said filter into said path of said light upon receipt of the corresponding one of said stop signals.

3. An arrangement as set forth in claim 1, wherein said common terminating means comprise a shutter, and means for moving said shutter into the path of said light in response to said terminating signal.

4. An arrangement as set forth in claim 1, wherein said second logic means comprise a NAND-gate having a first, second and third input respectively connected to said first, second and third photoreceiver means and an output connected to said terminating means.

5. An arrangement as set forth in claim 4, further comprising delay means interconnected between said output of sand NAND-gate and said terminating means, for delaying the operation of said terminating means relative to receipt of said terminating signal.

6. An arrangement as set forth in claim 1, wherein said first logic means comprise first, second and third AND-gate means each having a first input connected to a corresponding one of said photoreceiver means, a second input, and an output connected to a corresponding one of said individual light terminating means; first, second and third NAND-gate means, each having a first and second input respectively connected to a selected one of said outputs of said AND-gate means and an output connected to the second input of the remaining one of said AND-gate means.

7. An arrangement as set forth in claim 6, wherein each of said AND-gate means comprise a NAND-gate and an inverter connected to the output of said NAND-gate.

* * * * *